United States Patent [19]
Gropper

[11] 3,807,874
[45] Apr. 30, 1974

[54] OPTICAL SYSTEM FOR CENTRIFUGES
[75] Inventor: Lee Gropper, Los Altos Hills, Calif.
[73] Assignee: Beckman Instruments, Inc., Fullerton, Calif.
[22] Filed: Mar. 31, 1972
[21] Appl. No.: 240,202

[52] U.S. Cl. .............................. 356/197, 356/201
[51] Int. Cl. ............................................ G01n 21/24
[58] Field of Search ............................ 357/197, 201

[56] References Cited
UNITED STATES PATENTS
| | | | |
|---|---|---|---|
| 3,561,871 | 2/1971 | Beutelspacher | 356/201 |
| 3,470,381 | 9/1969 | Boyd | 356/201 |
| 3,652,860 | 3/1972 | Walker | 356/197 X |
| 1,907,803 | 5/1933 | Harvey | 350/50 |

Primary Examiner—Ronald L. Wibert
Assistant Examiner—F. L. Evans
Attorney, Agent, or Firm—Robert J. Steinmeyer; Ferd L. Mehlhoff

[57] ABSTRACT

Optical system mounted inside a vacuum chamber of a centrifuge for directing light passing through a cell within the chamber to form image of the cell outside the chamber. Optical elements are enclosed in an airtight housing in the chamber, and one of these elements is adjustable to permit focusing of the image in a desired plane.

1 Claim, 3 Drawing Figures

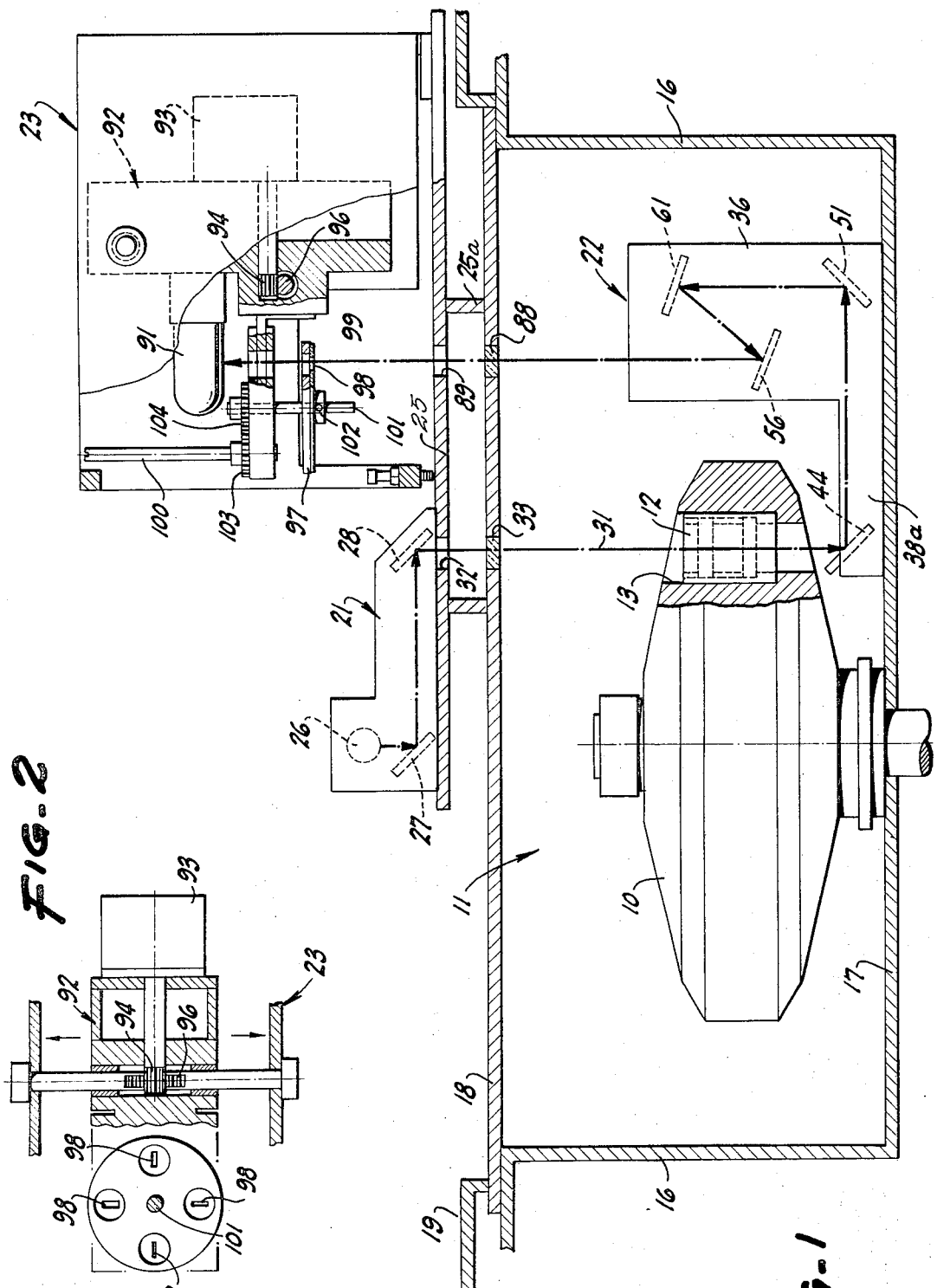

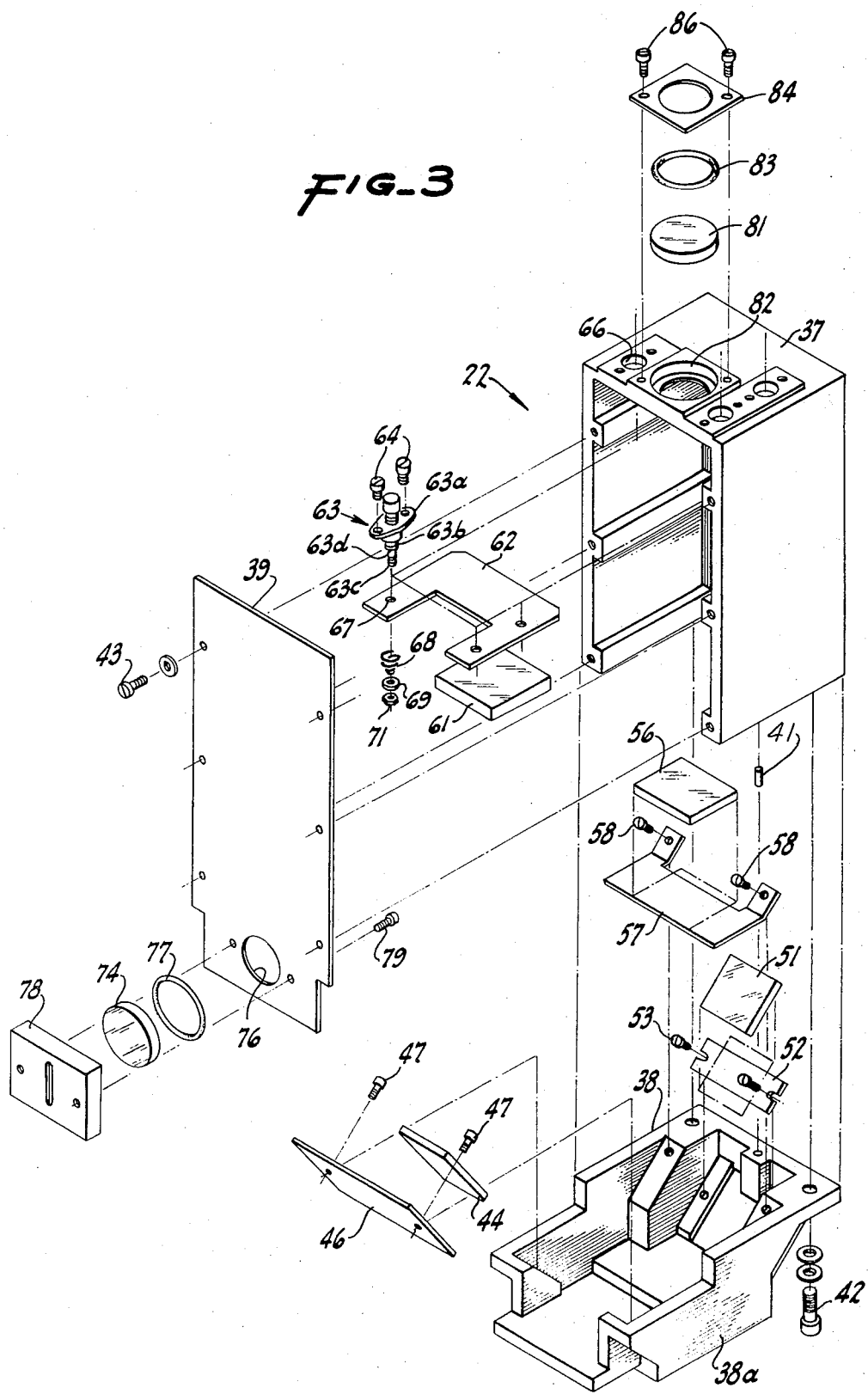

OPTICAL SYSTEM FOR CENTRIFUGES

BACKGROUND OF THE INVENTION

This invention pertains generally to centrifuges and more particularly to a compact optical system for use in a centrifuge.

One very useful technique for determining properties, such as concentration distribution, of a material in solution in a centrifuge is to pass a beam of light through the solution and measure the attenuation (absorption) of the light. This technique is generally implemented by a light source, a photoresponsive device and a lens system for directing the light through the cell and projecting an image of the cell on the photoresponsive device. Heretofore, in centrifuges of the type having a rotor enclosed in a vacuum chamber, the light source, photoresponsive device and lens system have been mounted outside the vacuum chamber. This arrangement requires a relatively long optical path and adds appreciably to the size of the centrifuge.

SUMMARY AND OBJECTS OF THE INVENTION

In the present invention, a compact optical system is provided inside the vacuum chamber of the centrifuge and directs light passing through the cell to form an image of the cell outside the chamber. The optical elements are enclosed in an air-tight housing within the chamber, and one of these elements is made adjustable to permit focusing of the image in a desired plane. The image is scanned by means of a photo-responsive device, and the entire system can be added to an existing centrifuge without significantly increasing the size of the instrument.

It is in general an object of the present invention to provide a new and improved optical system for centrifuges.

Another object of the invention is to provide an optical system of the above character which is compact and can be added to an existing centrifuge without materially increasing the bulk of the instrument.

Additional objects and features of the invention will be apparent from the following description in which the preferred embodiment is set forth in detail in conjunction with the accompanying drawings.

BRIEF DESCRIPTION OF THE DRAWINGS

FIG. 1 is a sectional view of one embodiment of an optical system incorporating the present invention in combination with the rotor and vacuum chamber of a centrifuge, with the scanner portion and photomultiplier tube of the optical system shown in an enlarged scale.

FIG. 2 is a schematic view of a portion of the scanner, illustrating, a scanning slit, and means for moving the photomultiplier tube and slit to scan the image.

FIG. 3 is an exploded isometric view of the portion of the optical system mounted within the vacuum chamber.

DESCRIPTION OF THE PREFERRED EMBODIMENT

The optical system is shown in connection with a centrifuge having a rotor 10 mounted in a vacuum chamber 11. A cell 12 is mounted in a bore 13 in the rotor and provides means for carrying materials to be analyzed. A similar cell or a counterweight can be provided in a diametrically opposed position to balance the rotor.

Chamber 11 is formed by a cylindrical side wall 16, a bottom wall 17 and a slidably mounted lid 18. Lid 18 is recessed below the top wall 19 of the centrifuge housing. When the lid is closed, chamber 11 can be evacuated by means of a vacuum pump, not shown. Other details of the centrifuge, such as the drive means for the rotor, cooling coils and a safety shield, are well known and have been omitted from the drawings for clarity.

The optical system includes a light source assembly 21, a mirror assembly 22 and a scanner 23. The mirror assembly is mounted inside chamber 11 and attached to bottom wall 17 by suitable means such as screws. Light source assembly 21 and scanner 23 are mounted on a mounting plate 25 which is supported by a pedestal 25a on chamber lid 18. The mounting plate, pedestal and chamber lid are secured together by suitable means such as screws.

The light source assembly 21 includes a lamp 26 and a pair of mirrors 27 and 28 which direct a beam of light 31 through an opening 32 in mounting plate 25 and a window 33 in chamber lid 18 to cell 12. The light in the beam is made parallel by mirrors 27, 28 or alternatively by a collimating lens, not shown. For absorption measurements the light preferably has a frequency in the ultraviolet range.

As may be seen in FIG. 3, mirror assembly 22 includes an air-tight housing 36 comprising an upper section 37, a lower section 38, and a cover plate 39. The upper and lower sections are held together by a locating pin 41 and screws 42, and the cover plate is attached to the upper section by screws 43.

An inclined flat mirror 44 is mounted on an extension 38a of the lower section of the mirror housing. This mirror is disposed below cell 12 in the path or light beam 31. It is cemented to a mounting bracket 46 which is secured to the housing extension by screws 47.

A second inclined flat mirror 51 is mounted inside the housing 36. This mirror is cemented to a mounting bracket 52 which is secured to the lower section of the housing by screws 53. A flat horizontally disposed mirror 56 is also mounted in the lower section of the housing. This mirror is cemented to a mounting bracket 57 which is attached to the housing by screws 58.

A focusing mirror 61 is mounted in the upper section of the housing 36. This mirror is cemented to a mounting bracket 62, and the bracket is mounted to the top wall of the housing by adjustment screw assemblies 63. Each of these assemblies includes a mounting plate 63a which is secured to the housing wall by screws 64. Each mirror assembly also includes an adjusting screw 63b which is threadedly mounted in plate 63a and passes through an opening 66 in the housing wall. A portion of reduced diameter 63c is provided at the inner end of the adjusting screw, and an annular shoulder 63d is provided between this portion and the remainder of the screw. Shoulder 63b engages the upper surface of mirror mounting bracket 62, and the portion of reduced diameter passes through an opening 67 in the bracket. A compression spring 68, washer 69 and nut 71 are mounted on the portion of reduced diameter below the bracket.

Windows are provided for passing light to and from the mirrors in housing 36. The first of these windows includes a transparent member 74 mounted over an opening 76 in the lower portion of cover plate 39 between inclined mirrors 44 and 51. An O-ring 77 provides a seal between the transparent member and cover plate, and the transparent member and O-ring are held by a mounting plate 78 which is secured to the cover plate by screws 79. The second window includes a transparent member 81 mounted in a counterbored opening 82 located in the top wall of housing 36 above fixed horizontal mirror 56. This window is sealed and the transparent member 81 is held in place by an O-ring 83, mounting plate 84, and screws 86.

Light passes from the mirror assembly within chamber 11 to scanner 23 through a window 88 in chamber lid 18 and an opening 89 in mounting plate 25. Window 88 and opening 89 are aligned with mirror 56 and window 81 in the mirror assembly.

Scanner 23 includes a photomultiplier tube 91 mounted on a carriage assembly 92 in alignment with opening 89 and windows 88 and 81. A motor 93 mounted on the carriage assembly drives a pinion gear 94 which engages a stationary rack gear 96 to provide means for scanning an image projected by mirror assembly 22.

A rotatably mounted disk 97 carries a plurality of scanning slits 98 which can be selectably moved into position in front of photomultiplier tube 91. These slits are of different sizes, and they are formed in opaque members 99 carried by the disk. The disk is affixed to a shaft 101 which is rotatably mounted on carriage assembly 92. A selector shaft 102 is coupled to the shaft 101 through gears 103 and 104 and provides means for moving the desired slit into alignment with the photomultiplier tube.

Operation and use of the invention can be described briefly. Light source assembly 21 directs the beam of light 31 toward centrifuge cell 12. Light passing through the cell is reflected by mirror 44 into mirror housing 36 where it is reflected from mirror 51 to focusing mirror 61 to mirror 56 and out through window 81 in a direction parallel to beam 31. The position of focusing mirror 61 is adjusted by screw assemblies 63 to align the beams and bring the image of the cell to the area of the scanning slit 98. Disk 97 can be moved axially on shaft 101 to adjust the position of slit 98 on the image plane. As the carriage is driven back and forth, photomultiplier tube 91 cooperates with slit 98 to scan the image and produce an electrical output signal which can be recorded and/or processed as desired.

The invention has important advantages such as its compact size which enables it to be installed in an existing centrifuge without adding materially to the size of the instrument. The focusing mirror is located inside the vacuum chamber of the centrifuge, and it can be readily adjusted to align the direct and reflected beams and provide a sharp image of the cell at the image plane. If desired, the image can be recorded photographically rather than photoelectrically, and refracting elements can be utilized in place of one or more of the mirrors.

It is apparent from the foregoing that a new and improved optical system for centrifuges has been provided. While only the presently preferred embodiment has been described, it will be apparent to those familiar with the art, certain changes and modifications can be made without departing from the scope of the invention as defined by the following claims.

I claim:

1. In a system for determining absorption properties of materials in a centrifuge cell carried by a rotor in a closed chamber having first and second windows disposed substantially in the same plane, means for passing a beam of light through said first window of said chamber and through the cell, an enclosed air-tight housing disposed within said chamber, said housing having inlet and outlet windows, a first mirror externally of said enclosed housing and disposed in the path of the light beam for reflecting light passing through the cell into the inlet window of said housing, a plurality of mirrors within said housing for reflecting the light from said first mirror through said outlet window and through said second window of said chamber to form an image of the cell externally of said chamber, and means for adjusting the position of one of said mirrors within said housing to focus the image in a predetermined position outside said chamber.

* * * * *